Inventor:
Jacob Von Straten Finne
By: Paul O. Pippel
Attorney.

Oct. 5, 1954  J. VON S. FINNE  2,690,638
HARVESTER REEL
Filed Feb. 1, 1951  3 Sheets-Sheet 3
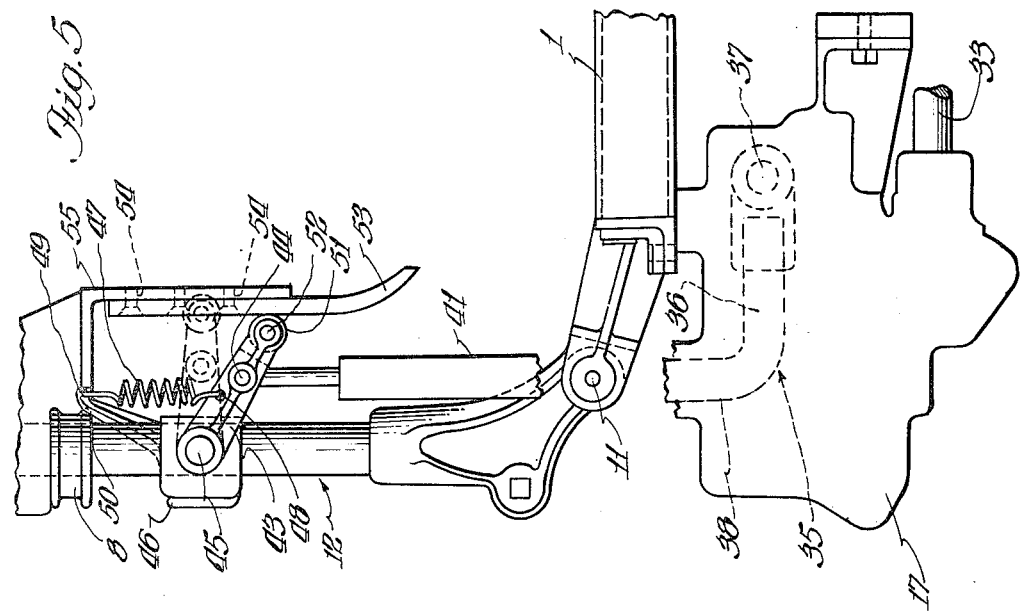
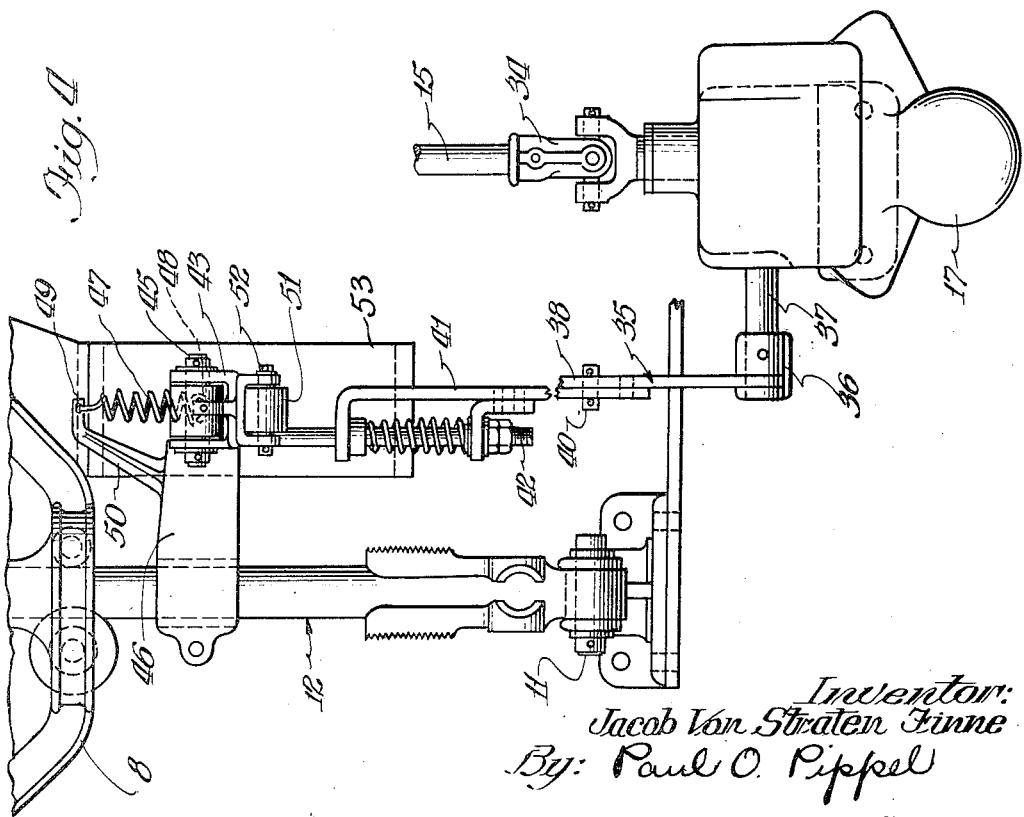
Inventor:
Jacob Von Straten Finne
By: Paul O. Pippel
Attorney.

Patented Oct. 5, 1954

2,690,638

UNITED STATES PATENT OFFICE 2,690,638

HARVESTER REEL

Jacob Von Straten Finne, Norrkoping, Sweden, assignor to International Harvester Company, Chicago, Ill., a corporation of New Jersey Application February 1, 1951, Serial No. 208,912

11 Claims. (Cl. 56—220)

This invention relates to harvesters and more specifically to harvester reels and operating and driving means therefor.

In harvesting fields having standing as well as lodged crops, the need is for a machine which may be quickly and simply reset from the operator's station to raise and lower the working position of the reel and its speed of rotation to meet specific conditions in various areas of the field as the machine is advanced thereacross. For lodged grain, for example, the reel must be lowered and its speed increased, and for standing grain the reel is raised and speed reduced. Such adjustment is necessary for efficient operation and it will be readily appreciated, therefore, that easy manipulation for resetting the machine is of primary importance especially where the conditions constantly vary.

A general object of the invention is to devise a simple, efficient and inexpensive arrangement for establishing the position and speed of the reel from the operator's station on the harvester machine.

A more specific object of the invention is to provide a novel arrangement for automatically changing the speed of rotation of the reel by means responsive to the position of the reel.

The invention contemplates the provision of a speed change transmission coupled to the reel for operation thereby as it is moved to predetermined working positions.

A further object of the invention is to provide an arrangement for feathering the slats or bats of the reel to adjust the resilient fingers carried thereby to the most advantageous working position.

These and other objects of the invention will become apparent from the specification and the drawings, wherein:

Fig. 4 is a fragmentary enlarged rear view of the driving means for the reel;

Fig. 5 is a side elevational view of the reel drive taken from the right of Figure 4.

Figure 1:
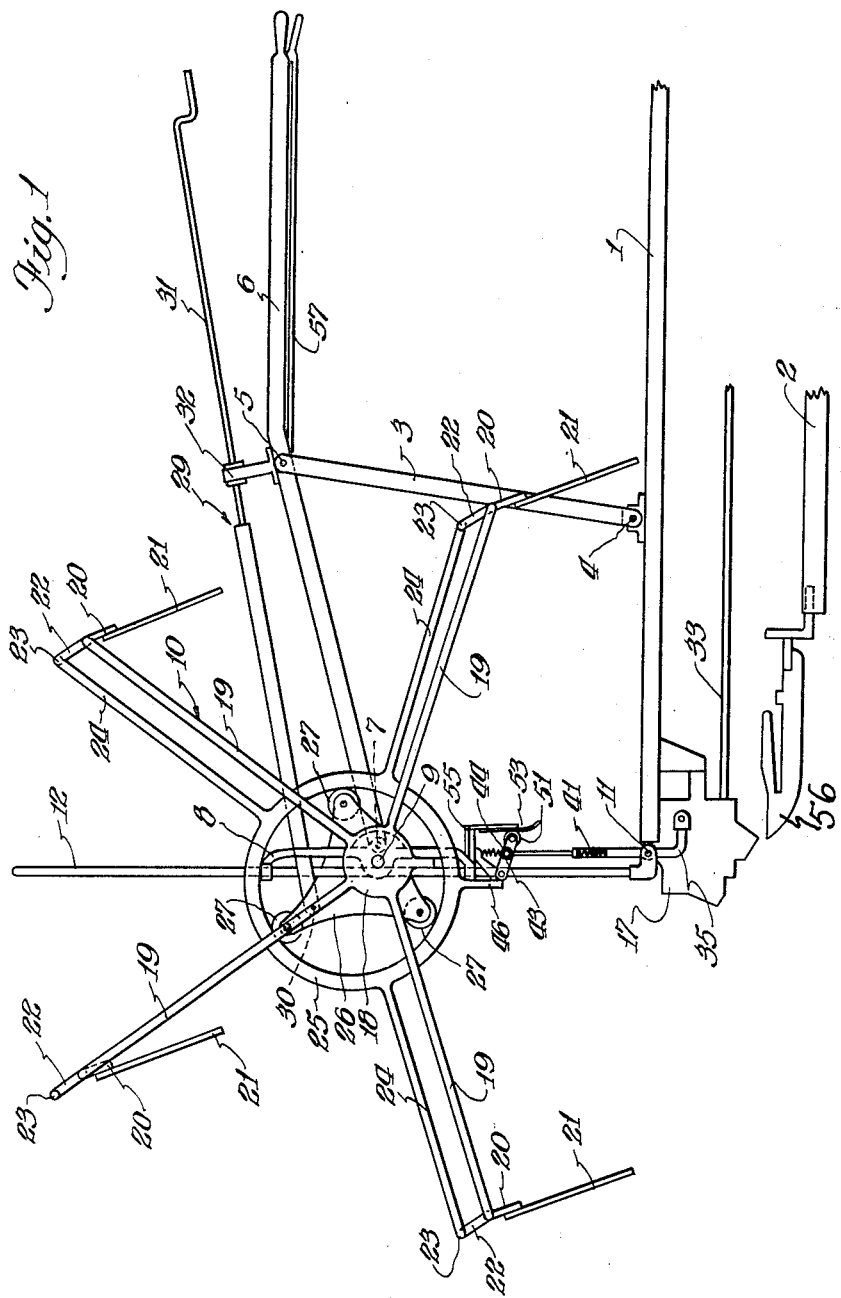
Fig. 1 is a fragmentary side elevational view of a harvester incorporating the invention.

Describing the invention in detail, the harvester may be of conventional design including a frame structure having beam members 1 and 2 which carry the reel and cooperating parts. The beam member 1 carries a support or link 3 pivotally connected at its lower end as at 4 to the frame, the upper end of link 3 being pivoted as at 5 to a lifting and lowering operating lever element 6 intermediate the ends thereof. The lever 6 may have a handle portion at one end disposed in close proximity to the operator's station (not shown) located rearwardly of the handle. The other or forward end of the lever 6 is bifurcated and pivotally connected on a generally horizontal axis by means of pins 7 (Figure 3) to a bearing frame 8 rotatably supporting a shaft 9 of the feathering reel generally designated 10. The beam member 1 is also pivotally connected on a generally horizontal axis as at 11 to the lower ends of an inverted U-shaped steering or guide frame 12 on which the bearing frame member 8 is slidably mounted for up and down movement thereon. The reel shaft 9 is overhung and rotates with respect to the bearing frame 8 and is driven by gears 13 and 14 of shafts 9 and 15, respectively. It will be seen that the shaft 15 is preferably nonround and disposed in a plane substantially parallel to the plane of the steering frame 12 and that the bevel or pinion gear 14 is slidable on the shaft 15 longitudinally thereof and is held in meshing relationship with the ring gear 13 by a keeper 16 formed as an integral part of the bearing frame 8. The driving gear 14 is connected through the shaft 15 to a conventional gear box 17.

Figure 2:
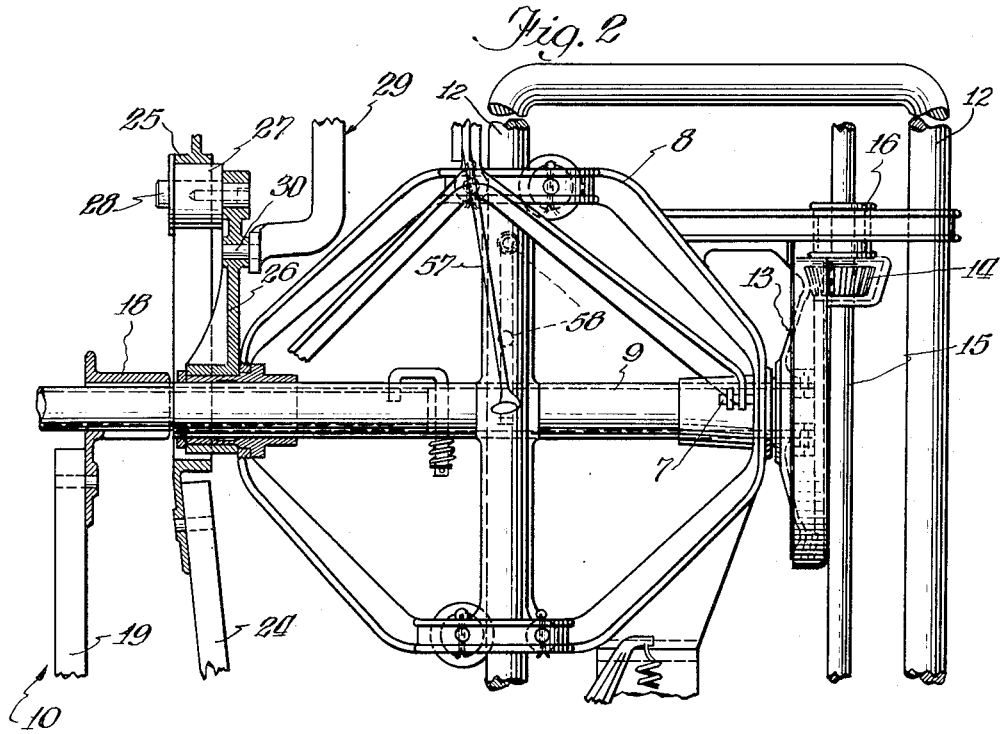
Fig. 2 is an enlarged rear view, with parts broken away and shown in section, of the bearing member supporting the reel.
Figure 3:
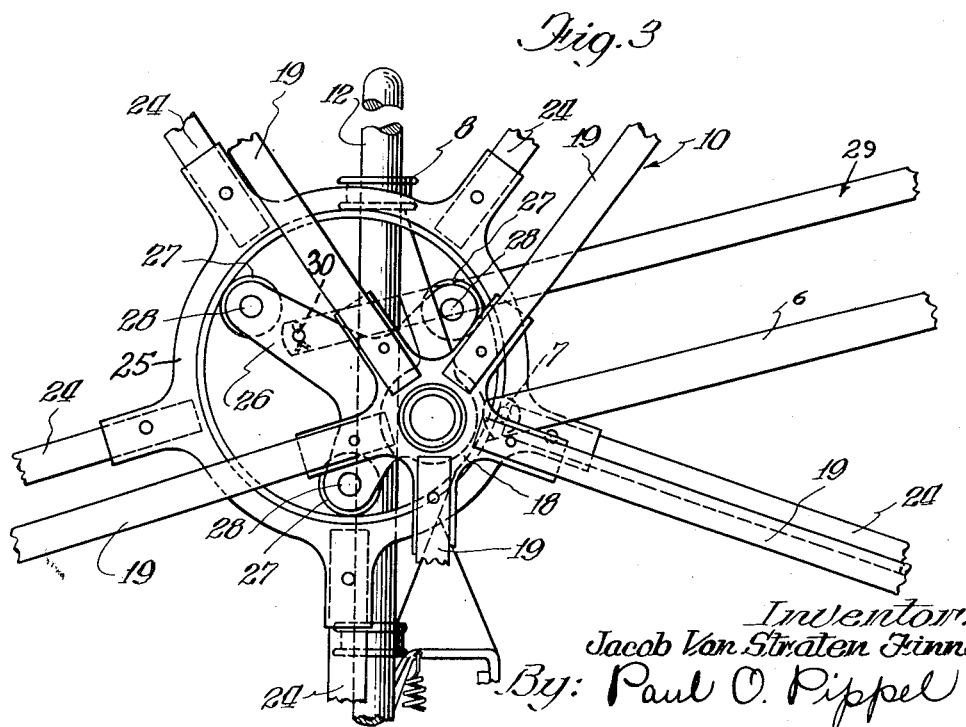
Fig. 3 is an enlarged end view taken from the left of Figure 2 of the reel and cam arrangement for feathering the slats of the reel.

The reel comprises a hub 18 at each end connected to the shaft 9 for rotation therewith, each hub 18 being provided with radial arms 19. It will be seen that the hub 18 and the arms connected thereto at one end of the reel are shown in Figure 2 and the other end of the reel including hub 18 and arms 19 are shown in Figures 1 and 3. A slat 20 is pivoted between each pair of arms 19 and is provided with finger-like grain lifting springs or tines 21. Each slat 20 is further provided with a crank lever 22 projecting from the slat and pivoted at its outer end as at 23 to the outer end of a spider arm 24 which is fixedly connected to or integral with a rotatable spider or cam ring 25 mounted eccentrically with respect to the reel shaft 9. The spider is supported by a cam member 26, which is supported on shaft 9, and provided with three radially projecting extensions, the ends of which support rollers 27 rotating on studs 28 fixed to said extensions of member 26. The position of the cam member 26 in relation to the shaft 9 is determined by an adjusting assembly or control element generally designated 29 (Fig. 1) which comprises a rod having one end pivoted as at 30 to the longest projection of member 26, the other end of the rod having a threaded connection with a crank 31 which in turn is rotatably mounted in a bracket 32 fixed on the lifting lever 6, the crank 31 being only rotatable in bracket 32 and being held against axial movement with respect thereto. The handle end of the crank 31 is disposed adjacent to the handle of the lever 6. All of this structure 29 through 31 constitutes bat feathering means.

The power required for rotating the reel is supplied by a shaft 33 which is operatively connected in conventional manner as well known in the art to the power-take-off of the driving unit, such as a tractor of the harvesting machine. The shaft 33 may be connected to a separate engine if desired and leads into the gear box 17 and transmits power through the gear box and through a universal joint 34 to the shaft 15. The gear box 17 is of conventional design comprising a change speed sliding gear system such as is well known and shown in U. S. Patent 2,487,735 (see Fig. 2).

Preferably the gearing system provides for two speed changes, the gearing being shifted by movement of a lever generally designated 35 which is of bell-crank form and comprises a substantially horizontal leg 36 connected at its outer end to a shifting fork shaft 37 as by a pin seen in Figure 4. The leg 36 merges into the lower end of a generally vertical leg 38 of the lever 35, the upper end of leg 38 being pivotally connected on a substantially horizontal axis as by a pin 40 to the lower end of a link 41, the link 41 having its other end pivotally connected through a spring rod 42 to a lever 43 intermediate the ends thereof as at 44. The operating lever 43 is pivotally connected as at 45 on a substantially horizontal axis to a bracket 46 which is adjustably secured to the steering frame 12. The lever 43 is continuously urged or biased to rotate upwardly about pivot 45 (see Figure 5) by means of a tension spring 47 which has its lower ends pivotally connected as at 48 to lever 43 intermediate the ends thereof, the spring 47 having its upper end anchored at 49 to an upwardly extending lug or arm 50 of the bracket 46. The other end of the lever 43 is provided with a roller or contact area 51 rotatably connected to the lever by a transverse pin 52 on a substantially horizontal axis. The roller 51 is arranged to engage a vertically elongated track or rail or contact means 53 which at its lower end is curved outwardly away from the lever 43 and provides a contact surface for a purpose hereinafter described. The rail 53 is secured in any convenient manner such as by rivets 54 to a depending bracket 55 of the bearing frame 8.

In operation when harvesting standing grain, the machine travels with the reel in a certain upper working position, the reel rotating with such speed in relation to the speed of travel of the machine that the grain lifting fingers, which then have a substantially vertical position, move in the traveling direction of the machine with substantially the same speed as the machine itself, so that in relation to the grain they perform a dipping motion. When the machine is to be adjusted for harvesting lodged grain, the reel is lowered manually by means of the lifting lever 6 (Figure 1) on the steering frame 12, when it also may be tilted forwardly to a suitable angular position, whereby the slats 20 are automatically reset together with the grain lifting springs or fingers 21 to a reclining position in the traveling direction of the machine, which position may, as required, be adjusted by turning the crank 31 to thereby affect the angular position of the member 26 in relation to the lifting lever. The automatic reset of the slats 20 is effected merely by rotation of the reel with the guide frame in an arc about points 11, 11, whereby when the frame 12 is tilted fore or aft, the angular relationship of the bats with respect to the ground is commensurate. Simultaneously with lowering the reel to its lower working position, the two-speed gears in the gear box 17 are adjusted or shifted, so that the drive shaft 9 of the reel is driven at the higher speed, which, preferably, is about 40 per cent higher than that which is used when the reel is driven in its upper position for standing grain. It will be understood that with the reel in its upper position, the operating lever 43 of the control means for the gear box 17, under the influence of spring 47, assumes the position shown in phantom lines in Fig. 5 and raises the shifting linkage means 42, 41 and 35 to shift the two-speed gears to low speed. The adjustment of the speed when the reel is lowered is effected by the rail 53 engaging the roller of the lever 43 and rotating the lever 43 downwardly against the expansion of the spring 47 to the position shown in the Figs. 4 and 5. By lowering the reel and reclining the grain lifting fingers or springs in connection with increasing the speed of the reel, the grain lifting fingers will be forced into contact with the lodged grain and by a combing action convey it past the sickle 56 onto the pick-up platform.

When the reel is raised again for harvesting standing grain, the engagement rail 53 is disengaged from the arm 43, whereby said arm will be caused to swing upwardly by the action of the spring 47, so that the gear is adjusted to lower speed. The curvature of the lower end of the rail insures proper engagement of the rail and the roller 51.

It will be noted that adjustment of the position of the reel on the frame 12 is maintained by means of a latching mechanism 57 which is removably entered into any of a plurality of holes 58 in the frame 12. This arrangement is preferably of a type shown in U. S. Patent 1,004,930 to J. A. Stone issued October 3, 1911.

What is claimed is:

1. In a harvester for harvesting standing and lodged crops from a field, a mobile frame structure, an upright guide frame having a lower end pivoted to the frame structure on a generally horizontal axis, a bearing slidably supported upon the guide frame for up and down movement thereon, a rotatable feathering reel of the type including a plurality of bats having supplementary movement and control means operatively associated therewith for regulating said movement and said reel having a shaft rotatably mounted upon said bearing on a generally horizontal axis, an operating element pivotally mounted upon said frame structure on a generally horizontal axis and operatively connected with said bearing for raising and lowering the bearing with the reel on said guide frame and movable with said guide frame fore and aft about the axis of pivot of said guide frame whereby moving the reel toward and away from the ground respectively, said control means including a feathering cam member carried upon said shaft, a control element pivotally connected to said member on a generally horizontal axis and operable to rotate said member about the shaft for presetting, said control element supported solely upon said operating element for conjunctive movement therewith whereby movement of the reel by said operating means either fore or aft or up and down does not effect the relationship of said control element with respect to said member.

2. In a machine for harvesting standing and lodged crops and having a frame tiltable fore and aft, a reel mounted on the frame for setting thereon in an upper working position for harvesting standing crops and in lower working position for lodged crops, means for driving the reel and including change-speed means, a linkage operatively connected between the change-speed means and the reel for automatically shifting the former into high speed when said reel is in lower working position and into low speed when the reel is in upper working position, a lever for raising and lowering the reel movably supported intermediate its ends and having one end pivotally connected to the reel, said reel including adjustable bats, and means for controlling the movement of said bats and including an adjusting element carried by said lever for movement therewith, whereby the setting of the bats with respect to the lever remains constant irrespective of the position of the reel on the frame.

3. In a harvester, a support, a reel movably mounted thereon for movement to a plurality of working positions, driving means for rotating the reel operatively associated therewith and including change-speed gear means, and a linkage operable between said gear means and the reel responsive to movements of the reel to said working positions to set the speed of said gear means in predetermined corresponding relationship with the position of the reel and comprising a rail member movable with the reel, a lever pivotally supported at one end on the support and carrying a roller at the other end in the path of travel of the rail for engagement thereby to rotate the lever in a predetermined manner, gear shifting means associated with said change-speed gear means and operatively connected to said lever intermediate the ends thereof, and spring means acting against said lever for constantly biasing the lever to rotate in a direction reverse to the first-mentioned direction of rotation of the lever.

4. In a harvester having a supporting framework, a guiding frame pivoted at its lower end thereto on a generally horizontal axis, a bearing frame slidably mounted on the guiding frame for movement up and down thereof, a reel having a shaft journaled on said bearing frame, driving means for the reel including a shaft extending generally parallel to the plane of movement of said reel with said bearing frame on said guiding frame and coupled in driving relationship with said first-mentioned shaft, change-speed gear means coupled with the second-mentioned shaft, a shifting lever connected to the change-speed gear means and movable in a generally vertical plane for effecting a shifting of the gear means, a depending rail on the bearing frame, an operating lever pivoted at one end to said guide frame and having a roller at its other end engageable by the rail, spring means reacting between the operating lever and the guide frame tending to rotate the operating lever upwardly, and a link connected at its upper end to said operating lever intermediate the ends thereof and at its lower end to said shifting lever.

5. In a farm machine having a support, a reel movable thereon to a plurality of working positions, driving means connected to the reel and including a change-speed gearing, and shifting means coupled between said change-speed gearing and said reel whereby movements of the reel to different positions effects predetermined speed changes from said driving means to the reel and comprising contact means having surface movable with the reel in a predetermined path, shifting means associated with said gearing, and an operating lever pivoted on said support and having a contact area disposed in said path and adapted for engagement with said contact means at said surface for actuation thereby, and an operative connection between said lever and said shifting means for actuation thereby.

6. In a harvester comprising a support structure, an upstanding guide frame movably connected thereto, a reel structure including a reel slidably mounted on said frame for movement up and down thereon, drive means for rotating said reel operatively coupled therewith and comprising a change-speed gearing located adjacent the connection between said frame and said support, a drive shaft extending upwardly from said gearing generally parallel to said frame, a pinion gear rotatable with the drive shaft and slidable up and down thereon, a ring gear carried by the reel structure and meshing with said pinion gear, a depending rail on said reel structure disposed rearwardly of the frame generally parallel thereto, a lever pivoted at one end to said frame and extending rearwardly thereof, and having an area engageable by the rail, a shifting linkage connected to the lever at a point rearwardly of said frame and operatively associated with said change-speed gearing, means connected to the lever for urging it upwardly, said rail being adapted to engage said lever at said area thereof to move the lever and actuate said linkage upon movement of said reel structure downwardly to operate said gearing and change the speed of the reel as predetermined.

7. In a field traversing machine for harvesting standing and lodged grain, a frame structure including a steering frame tiltably mounted thereon, a reel mounted on the steering frame and adjustable thereon to an upper working position for harvesting standing crops and to a lower working position for operation upon lodged crops, said reel being of a type comprising fingered bats having supplementary movement relative to the reel and feathering means operatively associated therewith for adjusting the action of said bats in a manner effecting in the upper working position of the reel a disposition of the bats such that they assume a substantially vertical position when entering the standing grain with substantially a dipping motion, means drivingly connected with the reel and carried upon the frame structure for driving said reel at a slower speed in the upper working position thereof and at a faster speed in the lower working position thereof, said slower speed being substantially equal to the speed of field traverse of the machine, operating means for raising, lowering and tilting said reel pivotally connected therewith and pivoted upon the frame, operating means connected to said feathering means and carried by said first mentioned operating means whereby during up and down movements of the reel the setting of said feathering means is substantially constant, said first mentioned operating means adapted to tilt said frame forwardly when the reel is in lower position whereby shifting the axis of rotation of the reel and thereby without affecting the setting of said feathering means automatically changing the relationship of the bats with respect to the ground from said vertical disposition when entering the grain to a reclining disposition with regard to the direction of travel of the machine to afford a combing action for the bats when entering the grain at accelerated speed in said lower working position.

8. In a field traversing machine for harvesting standing and laying grain, a frame structure, a guide frame carried by the frame structure, a reel carrier adjustably mounted on the guide frame, a reel journaled to said carrier, manually controllable means for raising and lowering the reel carrier pivotally connected thereto and to said frame structure, power means operatively associated with the reel for driving the same and formed and arranged to drive said reel at a slower speed in upper working position and at a higher speed in lower working position, said reel including adjustable slats having supplementary movement, means for adjusting the slats pivotally connected thereto and carried by said manually controllable means, said guide frame and manually controllable means for raising and lowering the reel carrier being pivotally mounted on the frame structure so as to enable the guide frame to be tilted forwardly when the reel is in a lowered position so as to dispose the reel slats at a correspondingly increased inclination suitable for exerting a greater combing action on laying crops.

9. In a field traversing machine for harvesting standing and lodged crops, a frame structure, a steering frame upstanding therefrom and having a lower end pivoted to the frame structure on a generally horizontal axis for fore and aft tilting movement thereon, bearing means movably mounted upon said steering frame for up and down movement thereupon, a rotatable feathering reel having a shaft rotatably journaled and supported on said bearing means, said reel positionable attendant to movement of said bearing means on said steering frame to an upper working position adjacent to the upper end of the steering frame for operating upon standing crops and to a lower working position adjacent to the lower end of the steering frame for operating upon lodged crops, said reel comprising a framework about the shaft and connected therewith, peripheral fingered bats extending axially of the reel and mounted upon the framework for supplementary movement relative to the reel, control means cooperatively associated with and disposing the bats in the upper working position of the reel so that they assume a generally vertical position to enter the standing grain with a substantially dipping motion, a two-speed driving means having a driving connection with the shaft and responsive to the position of the reel to drive it at a lower speed in the upper working position and at a higher speed in the lower working position thereof, common means for raising and lowering the reel and tilting said steering frame movably supported upon said frame structure and carrying said control means to effect up and down movements of the reel without changing the setting of said bats, said common means adapted to tilt said steering frame into the direction of travel of the machine when the reel is in lower position whereby shifting the axis of rotation of the reel and thereby without changing the setting of said bats automatically changing the relationship of the bats with respect to the ground from said vertical position when entering the grain to a reclining disposition with regard to the direction of travel of the machine to afford a combing action for the bats when entering the lodged grain at accelerated speed in said lower working position.

10. In a harvester for harvesting standing and downed crops, a frame structure, a guide frame upstanding from and connected to the frame structure, a rotatable reel having a shaft movably carried from the guide frame for up and down movement thereon with the reel, said reel positionable in an upper working position for operating upon standing crops and in a lower working position for downed crops, means for driving the reel having a driving train connected with the shaft and including a two-speed transmission, a linkage operative between the reel and the transmission and actuable by the reel in response to said positioning thereof upon said guide frame for mobilizing said transmission to drive said reel in the upper working position at a slow speed and in the lower working position at a faster speed, and means operatively associated with said reel for selectively positioning it on said guide frame at the will of an operator.

11. A harvester according to claim 10 and said transmission comprising a gearing containing casing carried by the frame structure adjacent to said guide frame, a shifting element extending from the casing, movement imparting means connected to said element and extending to adjacent said guide frame, and means on the reel movable therewith along said guide frame and positioned in engaging relationship to said movement imparting means for actuating the latter.

References Cited in the file of this patent

UNITED STATES PATENTS

| Number | Name | Date |
|---|---|---|
| 665,411 | Dawson | Jan. 8, 1901 |
| 1,008,778 | Boda | Nov. 14, 1911 |
| 1,241,446 | Saunders et al. | Sept. 25, 1917 |
| 1,475,073 | McClure | Nov. 20, 1923 |
| 1,611,503 | Arnzen | Dec. 21, 1926 |
| 2,095,364 | Konow | Oct. 12, 1937 |
| 2,431,397 | Harrison | Nov. 25, 1947 |
| 2,497,729 | Heth et al. | Feb. 14, 1950 |